US011824963B2

(12) United States Patent
Lin (10) Patent No.: US 11,824,963 B2
(45) Date of Patent: Nov. 21, 2023

(54) PACKET PROCESSING METHOD AND DEVICE

(71) Applicant: HUAWEI TECHNOLOGIES CO., LTD., Shenzhen (CN)

(72) Inventor: Liankui Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 17/557,270

(22) Filed: Dec. 21, 2021

(65) Prior Publication Data

US 2022/0116486 A1 Apr. 14, 2022

Related U.S. Application Data

(63) Continuation of application No. PCT/CN2020/094800, filed on Jun. 7, 2020.

(30) Foreign Application Priority Data

Jun. 27, 2019 (CN) .......................... 201910568044.7

(51) Int. Cl.
*H04L 69/166* (2022.01)
*H04L 12/46* (2006.01)
*H04Q 11/00* (2006.01)

(52) U.S. Cl.
CPC ........ *H04L 69/166* (2013.01); *H04L 12/4633* (2013.01); *H04Q 11/0067* (2013.01)

(58) Field of Classification Search
None
See application file for complete search history.

(56) References Cited

U.S. PATENT DOCUMENTS

2003/0235205 A1\* 12/2003 Song .................. H04Q 11/0067
370/466
2009/0252494 A1\* 10/2009 Capurso ............ H04Q 11/0067
398/58

(Continued)

FOREIGN PATENT DOCUMENTS

CN 101043294 A \* 9/2007
CN 101043294 A 9/2007

(Continued)

OTHER PUBLICATIONS

Yejun Liu et al.,"Optimizing Backup Optical-Network-Units Selection and Backup Fibers Deployment in Survivable Hybrid Wireless-Optical Broadband Access Networks", May 2012Journal of Lightwave Technology 30(10):1509-1523, total:15pages.

(Continued)

*Primary Examiner* — David W Lambert
(74) *Attorney, Agent, or Firm* — Maier & Maier, PLLC (57) ABSTRACT

An optical network unit (ONU) receives an Ethernet packet sent by user device and slices the Ethernet packet based on information about a minimum transmission unit to generate a first Ethernet packet slice, where a length of the minimum transmission unit is an integer multiple of a length of the first Ethernet packet slice. The ONU encapsulates the Ethernet packet slice and a slice identifier into a GEM frame, wherein the slice identifier indicates that the length of the minimum transmission unit of the OTN is an integer multiple of the length of the Ethernet packet slice. The Ethernet packet slice does not need to be processed by a network processor or a traffic management module in transmission of the OLT, thereby reducing a delay of network transmission.

9 Claims, 7 Drawing Sheets

(56) References Cited

U.S. PATENT DOCUMENTS

| | | | | |
|---|---|---|---|---|
| 2010/0104288 A1* | 4/2010 | Zheng | ............... | H04L 45/62 398/67 |
| 2017/0017484 A1* | 1/2017 | Elmoalem | ............ | G06F 8/65 |
| 2017/0105061 A1* | 4/2017 | Kim | ............ | H04Q 11/0003 |

FOREIGN PATENT DOCUMENTS

| | | |
|---|---|---|
| CN | 101924702 A | 12/2010 |
| CN | 102064964 A | 5/2011 |
| CN | 102957590 A | 3/2013 |
| CN | 103222237 A | 7/2013 |
| CN | 104125518 A | 10/2014 |
| CN | 105282114 A | 1/2016 |
| CN | 107205180 A | 9/2017 |
| CN | 107302412 A | 10/2017 |
| CN | 107613414 A | 1/2018 |
| CN | 107666626 A | 2/2018 |
| CN | 108023835 A | 5/2018 |

OTHER PUBLICATIONS

Pengchi Wang et al., "Study of GPON Transmission Convergence Layer", Mar. 9, 2007, total:3pages (English abstract provided).

Frank Effenberger et al., "Draft G.984.3 Revised", ITU-T Recommendation G.984.3, "Gigabit-capable Passive Optical Networks (G-PON): Transmission convergence layer specification", Study Period 2005-2008, International Telecommunication Union, May 24, 2007, 143 pages, XP017528609.

T. Herbert et al., "Fragmentation option for Generic UDP Encapsulation; draft-herbert-gue-fragmentation-01", Internet-Draft, Internet Engineering Task Force, Oct. 19, 2015, 13 pages, XP015124222.

\* cited by examiner

PACKET PROCESSING METHOD AND DEVICE

CROSS-REFERENCE TO RELATED APPLICATIONS

This application is a continuation of International Application No. PCT/CN2020/094800, filed on Jun. 7, 2020, which claims priority to Chinese Patent Application No. 201910568044.7, filed on Jun. 27, 2019. Both of the aforementioned applications are hereby incorporated by reference in their entireties.

FIELD

The embodiments relate to the field of passive optical network technologies, and in particular, to a packet processing method and a device.

BACKGROUND

Figure 1:
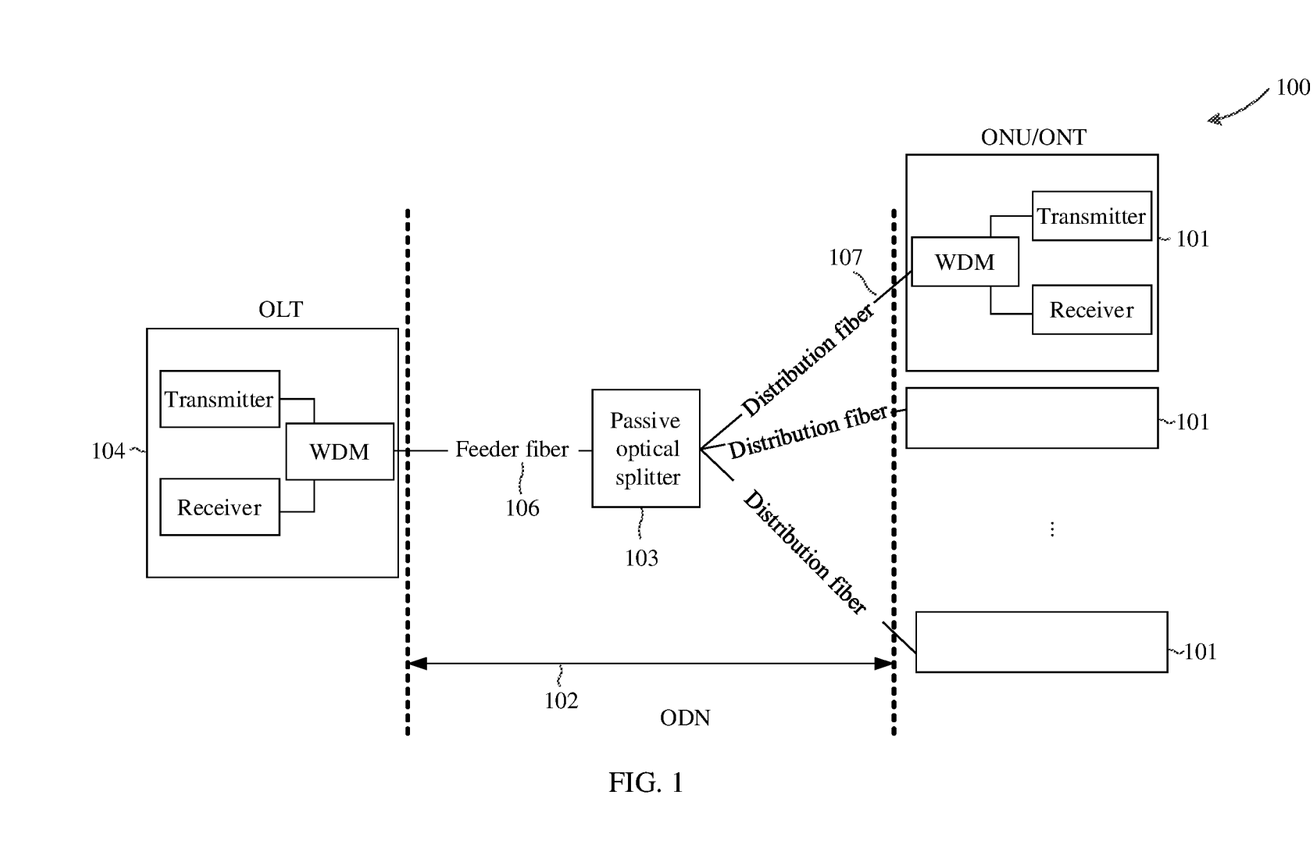
FIG. 1 is a schematic diagram depicting a structure of a PON system.

A passive optical network (PON) is an optical access technology that uses a point-to-multipoint topology structure. FIG. 1 is a schematic diagram depicting a structure of a PON system. As shown in FIG. 1, the PON system 100 includes an optical line terminal (OLT) 104, an optical distribution network (ODN) 102, and an optical network unit (ONU) or an optical network terminal (ONT) 101. The ODN 102 is a passive optical splitting device and includes three parts: a passive optical splitter 103, a feeder fiber 106, and a distribution fiber 107. In the PON system, the ODN 102 divides one optical fiber into a plurality of optical fibers, and the ONU 101 shares bandwidth. A transmission direction from the OLT 104 to the ONU 101 is referred to as a downstream direction, and a transmission direction from the ONU 101 to the OLT 104 is referred to as an upstream direction. An upstream service is accessed in time division multiple access mode, and each ONU 101 can send its upstream data only in a timeslot allocated by the OLT 104. A downstream service sends information and data to each ONU 101 in time division multiplexing broadcast mode. The ODN 102 transmits downstream data of the OLT 104 to each ONU 101 and gathers upstream data of a plurality of ONUs 101 for transmission to the OLT 104. A structure of the ONU 101 is similar to that of the ONT 101. The ONU 101 and the ONT 101 interchangeable.

A transmission path of an existing PON system includes the OLT 104, the ODN 102, and the ONU 101. The OLT 104 includes an upstream component, a switching and forwarding component, and a PON line card. Both the upstream component and the PON line card include network processor (NP) or traffic management (TM) modules. The TM module mainly controls quality of service (QoS) of a service flow based on a network transmission bandwidth and a priority of the service flow. The NP is a core chip for processing an Ethernet service, and mainly performs forwarding processing tasks for various Ethernet services, such as packet processing, protocol analysis, and route searching on Ethernet service data. After an Ethernet packet on a network side enters the OLT 104, the NP or TM module of the upstream component in the OLT 104 completes Ethernet packet forwarding processing and quality of service control, and the NP or TM module of the PON line card completes forwarding processing to a PON interface side and quality of service control of a PON ingress packet. In addition, in the ONU 101, a network processor or a traffic management module are also required to participate in packet forwarding processing and quality of service control.

On the transmission path of the PON system, forwarding processing and quality of service control performed on the Ethernet packet by the network processor or traffic management module at each level cause a delay of several microseconds to dozens of microseconds. For some services such as mobile fronthaul/backhaul, the delay is unacceptable to users. How to reduce or eliminate, in a PON system, a delay caused by packet forwarding processing and quality of service control by a network processor or a traffic management module to implement low-delay transmission is an urgent problem to be resolved.

SUMMARY

A packet processing method and a device implement low-delay transmission.

According to a first aspect, a packet processing method includes: an optical network unit ONU receives an Ethernet packet frame sent by a user device; the ONU slices the Ethernet packet frame based on information about a minimum transmission unit of an optical transport network OTN, to generate a first Ethernet packet slice, where a length of the minimum transmission unit of the OTN is an integer multiple of a length of the first Ethernet packet slice; and the ONU sends a GPON Encapsulation Mode (GEM) frame to an optical line terminal OLT, where the Ethernet packet slice and a slice identifier are encapsulated into the GEM frame, and the slice identifier indicates that the length of the minimum transmission unit of the OTN is an integer multiple of the length of the Ethernet packet slice. In this embodiment, the ONU slices the received Ethernet packet, and encapsulates the Ethernet packet slice and the slice identifier into a first GEM frame and sends the first GEM frame to the OLT. The slice identifier indicates that the length of the minimum transmission unit of the OTN is an integer multiple of the length of the Ethernet packet slice. For the Ethernet packet slice, the OLT does not need to perform packet forwarding processing and quality of service control, so that a delay caused by the packet forwarding processing and quality of service control can be reduced on a packet transmission path, thereby implementing low-delay transmission.

In a possible embodiment, the ONU obtains the information about the minimum transmission unit of the OTN; or the information about the minimum transmission unit of the OTN is stored in the ONU. Therefore, after receiving a packet frame of the user device, the ONU slices the packet frame based on the information about the minimum transmission unit of the OTN.

In a possible embodiment, the ONU caches the Ethernet packet slice based on a cache threshold, so that further transmission may be performed based on the cached Ethernet packet slice when sending of the Ethernet packet slice fails, thereby implementing link protection.

According to a second aspect, a packet processing method includes: an optical line terminal OLT receives a GEM frame sent by an optical network unit ONU, where an Ethernet packet slice and a slice identifier are encapsulated into the GEM frame, and the slice identifier indicates that a length of a minimum transmission unit of an OTN is an integer multiple of a length of the Ethernet packet slice; and the OLT sends an optical transponder unit, OTU frame to an OTN device, where the OTU frame carries the Ethernet packet slice and the slice identifier. In this embodiment, the GEM frame carries the Ethernet packet slice and the slice identifier. The slice identifier indicates that the length of the minimum transmission unit of the OTN is an integer multiple of the length of the Ethernet packet slice. The OLT does not need to perform packet forwarding processing and quality of service control on the Ethernet packet slice, so that a delay caused by the packet forwarding processing and quality of service control may be reduced on a packet transmission path, thereby implementing low-delay transmission.

In a possible embodiment, the OLT determines, based on the slice identifier, that NP or TM processing is not performed on the Ethernet packet slice. According to this method, it is ensured that the OLT does not need to perform packet forwarding processing and quality of service control on the Ethernet packet slice, so that a delay caused by the packet forwarding processing and quality of service control may be reduced on a packet transmission path, thereby implementing low-delay transmission.

In a possible embodiment, the OLT performs OTU framing on the Ethernet packet slice to generate the OTU frame, and the OTU frame carries the Ethernet packet slice and the slice identifier. According to this method, it can be ensured that the peer OLT does not perform forwarding processing and quality of service control on the Ethernet packet slice, thereby reducing a delay caused by packet forwarding processing and quality of service control and implementing low-delay transmission.

According to a third aspect, a packet processing method includes: an optical line terminal OLT receives an OTU frame sent by an optical transport network OTN device, where the OTU frame carries an Ethernet packet slice and a slice identifier, and the slice identifier indicates that a length of a minimum transmission unit of an OTN is an integer multiple of a length of the Ethernet packet slice; and the OLT encapsulates the Ethernet packet slice into a GEM frame and sends the GEM frame to an optical network unit ONU, where the GEM frame carries the slice identifier. According to this method, the OLT does not perform forwarding processing and quality of service control on the received Ethernet packet slice, thereby reducing a delay caused by packet forwarding processing and quality of service control and implementing low-delay transmission.

According to a fourth aspect, a packet processing method includes: an optical network unit ONU receives a GEM frame sent by an optical line terminal OLT, where the GEM frame carries a slice identifier, and the slice identifier indicates that a length of a minimum transmission unit of an OTN is an integer multiple of a length of an Ethernet packet slice; and the ONU restores the Ethernet packet slice to an Ethernet packet. According to this method, the ONU restores the received Ethernet packet slice, to ensure that a delay caused by packet forwarding processing and quality of service control is reduced on an entire transmission path, thereby implementing low-delay transmission.

In a possible embodiment, the GEM frame further carries a total quantity of slices of the Ethernet packet, and the method further includes: the ONU determines, based on the total quantity of the slices of the Ethernet packet, that all Ethernet packet slices of the Ethernet packet are received. According to this method, it can be ensured that the received Ethernet packet slice is restored to an Ethernet packet frame.

According to a fifth aspect, a passive optical network PON system includes the optical line terminal OLT configured to perform any one of the methods according to the second aspect in all optional manners and the optical network unit configured to perform any one of the methods according to the second aspect in all optional manners.

In a possible embodiment, the ONU is further configured to perform the method according to the fourth aspect.

In a possible embodiment, the OLT is further configured for the method according to the third aspect.

According to a sixth aspect, an optical network unit (ONU) that implements the methods according to the first aspect and the fourth aspect. The functions may be implemented by hardware or may be implemented by hardware executing corresponding software. The hardware or the software includes one or more modules corresponding to the functions.

According to a seventh aspect, an optical line terminal (OLT) that implements the methods according to the second aspect and the third aspect. The functions may be implemented by hardware or may be implemented by hardware executing corresponding software. The hardware or the software includes one or more modules corresponding to the functions.

According to an eighth aspect, a packet processing method includes: an optical line terminal OLT receives a GEM frame sent by an optical network unit ONU, where an Ethernet packet and an Ethernet packet identifier are encapsulated into the GEM frame; the ONU slices the Ethernet packet based on information about a minimum transmission unit of an optical transport network OTN, to generate an Ethernet packet slice, where a length of the minimum transmission unit of the OTN is an integer multiple of a length of the Ethernet packet slice; and the OLT sends an OTU frame to an OTN device, where the OTU frame carries the Ethernet packet slice, the Ethernet packet identifier, and a slice sequence number of the Ethernet packet slice.

In a possible embodiment, the OLT determines that NP or TM processing is not performed on the Ethernet packet slice.

In a possible embodiment, the OLT obtains the information about the minimum transmission unit of the OTN; or the information about the minimum transmission unit of the OTN is stored in the OLT.

In a possible embodiment, the OLT caches the Ethernet packet slice based on a cache threshold.

According to a ninth aspect, a packet processing method includes: an optical line terminal OLT receives an OTU frame sent by an optical transport network OTN device, where the OTU frame carries an Ethernet packet slice, an Ethernet packet identifier, and a slice sequence number of the Ethernet packet slice, and a length of the Ethernet packet slice is exactly divided by a length of a minimum transmission unit of the OTN; the OLT restores the Ethernet packet slice to an Ethernet packet based on the Ethernet packet identifier and the slice sequence number; and the OLT encapsulates the Ethernet packet into a GEM frame, and sends the GEM frame to an optical network unit ONU.

In a possible embodiment, the OTU frame further carries a total quantity of slices of the Ethernet packet, and the method further includes: the OLT determines, based on the total quantity of the slices of the Ethernet packet, that all Ethernet packet slices of the Ethernet packet are received.

According to a tenth aspect, a passive optical network (PON) system, includes the optical line terminal OLT configured to perform any one of the methods according to the eighth aspect in all optional manners, and the optical network unit configured to receive an Ethernet packet and send the Ethernet packet in a GEM frame to the OLT.

According to an eleventh aspect, an optical line terminal (OLT) that implements the methods according to the eighth aspect and the ninth aspect. The functions may be implemented by hardware or may be implemented by hardware executing corresponding software. The hardware or the software includes one or more modules corresponding to the functions.

For beneficial effects of the packet processing device provided in the eighth aspect to the eleventh aspect, refer to the beneficial effects brought by the second aspect and the possible implementations of the second aspect. Details are not described herein again.

According to a twelfth aspect, a packet processing device, including a memory and a processor.

The memory is configured to store program instructions.

The processor is configured to invoke program instructions in the memory to perform the packet processing method according to the first aspect, the second aspect, the third aspect, the fourth aspect, the eighth aspect, or the ninth aspect.

According to a thirteenth aspect, a readable storage medium, where the readable storage medium stores executable instructions. When at least one processor of the packet processing device executes the executable instructions, the packet processing device performs the packet processing method according to the first aspect, the second aspect, the third aspect, the fourth aspect, the eighth aspect, or the ninth aspect.

According to a fourteenth aspect, a program product. The program product includes executable instructions, and the executable instructions are stored in a readable storage medium. At least one processor of a packet processing device may read the executable instructions from the readable storage medium. The at least one processor executes the executable instructions, so that the packet processing device implements the packet processing method according to the first aspect, the second aspect, the third aspect, the fourth aspect, the eighth aspect, or the ninth aspect.

DETAILED DESCRIPTION OF THE EMBODIMENTS

The following describes the solutions in embodiments with reference to the accompanying drawings. In the descriptions, unless otherwise specified, "a plurality of" means two or more than two. In addition, to clearly describe the solutions in the embodiments, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference. "A and/or B" in the present disclosure may be explained as any one of A or B, or include A and B.

On a transmission path of an existing PON system, Ethernet packet forwarding processing and quality of service control performed by a network processor or a traffic management module at each level cause a delay of microseconds to tens of microseconds. A packet processing method and a device, may reduce or eliminate, in a PON system, a delay caused by packet forwarding processing and quality of service control by a network processor or a traffic management module, thereby implementing low-delay transmission. An Ethernet packet slicing layer and an Ethernet packet framing layer may be added to an optical network unit ONU. The Ethernet packet slicing layer slices an upstream Ethernet packet to generate an Ethernet packet slice, where a length of a minimum transmission unit of an OTN is an integer multiple of a length of the Ethernet packet slice. The Ethernet packet slice does not need to be processed by a network processor or a traffic management module in transmission of an OLT. In other words, the Ethernet packet slice may no longer be subject to forwarding processing and quality of service control by the network processor or the traffic management module. Therefore, the delay caused by the network processor or the traffic management module may be reduced on a packet transmission path, thereby implementing low-delay transmission. The following describes the solutions in detail with reference to the accompanying drawings.

Figure 2:
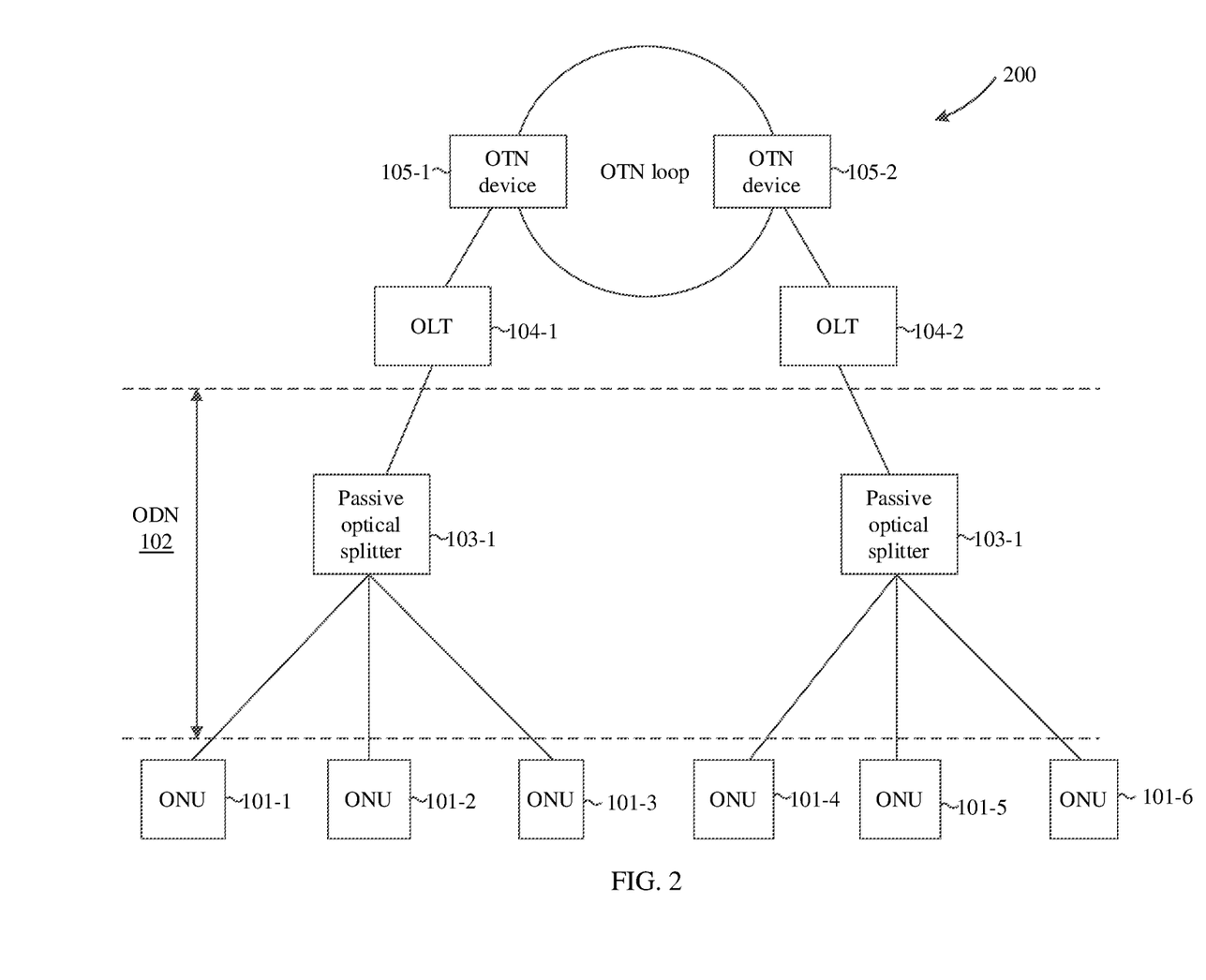
FIG. 2 is a flowchart of an embodiment of a packet processing method.

FIG. 2 is a schematic diagram depicting a structure of a system according to an embodiment. As shown in FIG. 2, an OLT 104-1 communicates with an optical transport network (OTN) device 105-1. The OLT 104-1 sends a packet of an ONU (101-1, 101-2, or 101-3) to the OTN device 105-1, and an OTN device 105-2 sends the packet of the ONU (101-1, 101-2, or 101-3) to a peer ONU (101-4, 101-5, or 101-6). The OLT 104-1 further receives a packet sent by the OTN device 105-1 and sends the received packet sent by the OTN device 105-1 to an ONU (101-1, 101-2, or 101-3) by using an ODN network 102. The OTN device 105-1 may be used as a bearer network of a PON and be configured to increase a transmission distance of a PON service or provide better service protection. A payload area of the OTN frame transmitted in an OTN system is divided by a quantity of bytes. The payload area is divided into at least one fixed-length byte block. A byte block may be considered as a minimum transmission unit of the OTN. Generally, content of a data frame transmitted in the PON system is mapped to one or more of the minimum transmission units.

Figure 3A:
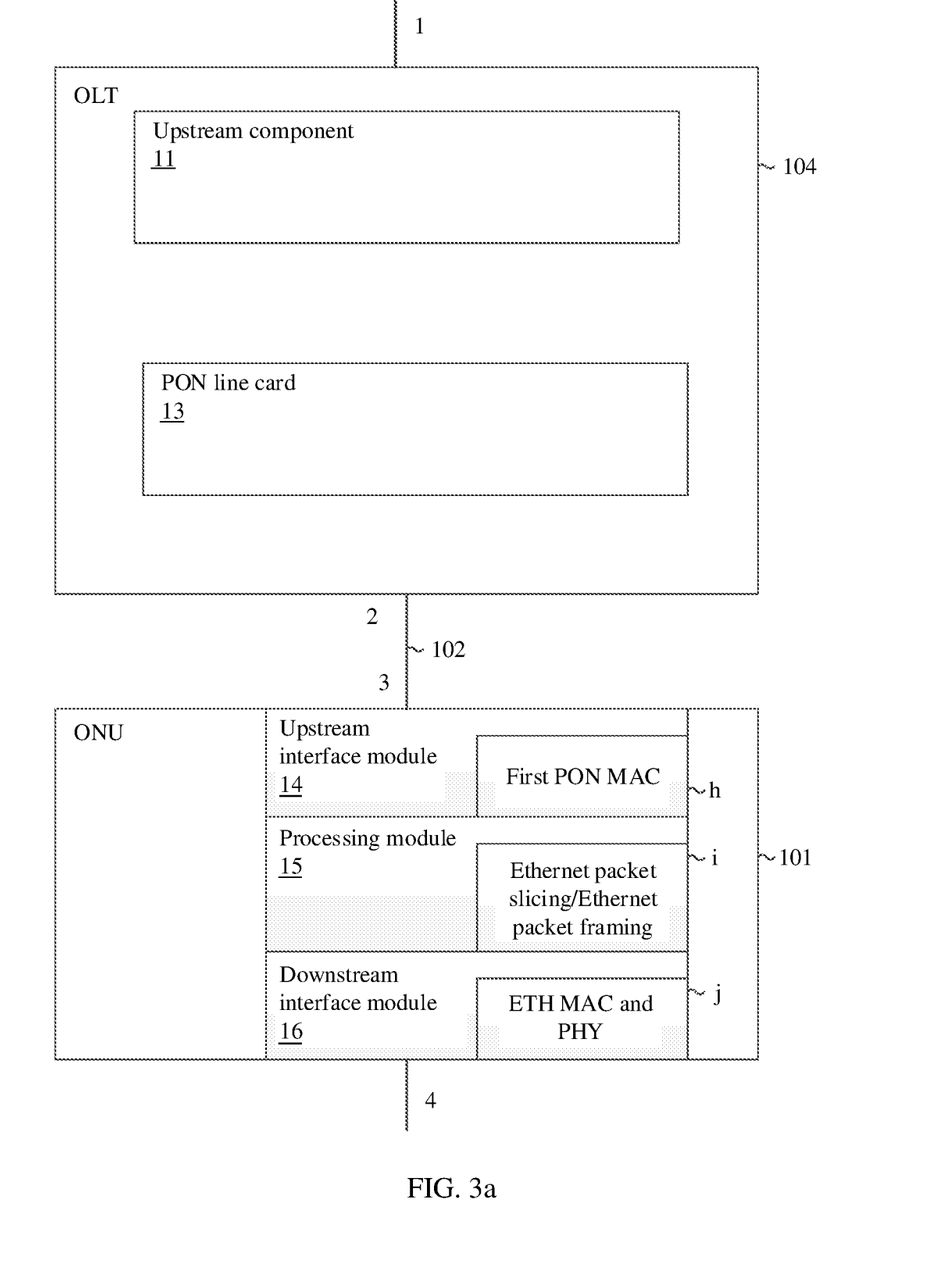
FIG. 3a is a schematic diagram depicting a structure of a PON system.

The solutions are applied to a PON system, and the PON system includes an ONU 101, an ODN 102, and an OLT 104. FIG. 3a is a schematic diagram depicting a structure of an embodiment of a PON system. As shown in FIG. 3a, the PON system includes an OLT 104, an ODN 102, and an ONU 101.

The ONU 101 includes an upstream interface module 14, a processing module 15, and a downstream interface module 16. Details are as follows.

The downstream interface module 16 is configured to receive a first Ethernet packet sent by user device.

The processing module 15 is configured to slice the first Ethernet packet based on information about a minimum transmission unit of an optical transport network (OTN), to generate a first Ethernet packet slice, where a length of a minimum transmission unit of the OTN is an integer multiple of a length of the first Ethernet packet slice.

The upstream interface module 14 is configured to send a first gigabit-capable passive optical network encapsulation method (GEM) frame to an optical line terminal OLT 104. The first Ethernet packet slice and a first slice identifier are encapsulated into the first GEM frame, and the first slice identifier indicates that the length of the minimum transmission unit of the OTN is an integer multiple of the length of the first Ethernet packet slice.

Optionally, the upstream interface module 14 is further configured to obtain the information about the minimum transmission unit of the OTN, or the processing module 15 is further configured to store the information about the minimum transmission unit of the OTN.

The processing module 15 is further configured to cache the first Ethernet packet slice based on a cache threshold.

Optionally, the upstream interface module 14 is further configured to receive a second GEM frame sent by the OLT 104. The second GEM frame carries a second Ethernet packet slice and a second slice identifier, and the second slice identifier indicates that the length of the minimum transmission unit of the OTN is an integer multiple of a length of the second Ethernet packet slice.

The processing module 15 restores the second Ethernet packet slice to a second Ethernet packet frame based on the second slice identifier.

Optionally, the second GEM frame further carries a total quantity of slices of the second Ethernet packet, and the processing module 15 is further configured to determine, based on the total quantity of the slices of the second Ethernet packet, that all fixed-length packet slices of the Ethernet packet are received.

The OLT 104 includes an upstream component 11 and a PON line card 13. The line card 13 is configured to receive a first GEM frame sent by the optical network unit ONU 101, where the first Ethernet packet slice and the first slice identifier are encapsulated into the first GEM frame, and the first slice identifier indicates that the length of the minimum transmission unit of the OTN is an integer multiple of the length of the first Ethernet packet slice. The upstream component 11 is configured to send a first OTU frame to an OTN device, where the OTU frame carries the first Ethernet packet slice and the first slice identifier.

Optionally, the line card 13 is further configured to determine, based on slice information, that network processor processing or traffic management is not performed on the first Ethernet packet slice.

Optionally, the upstream component 11 is further configured to generate the OTU frame based on the first Ethernet packet slice.

Figure 3B:
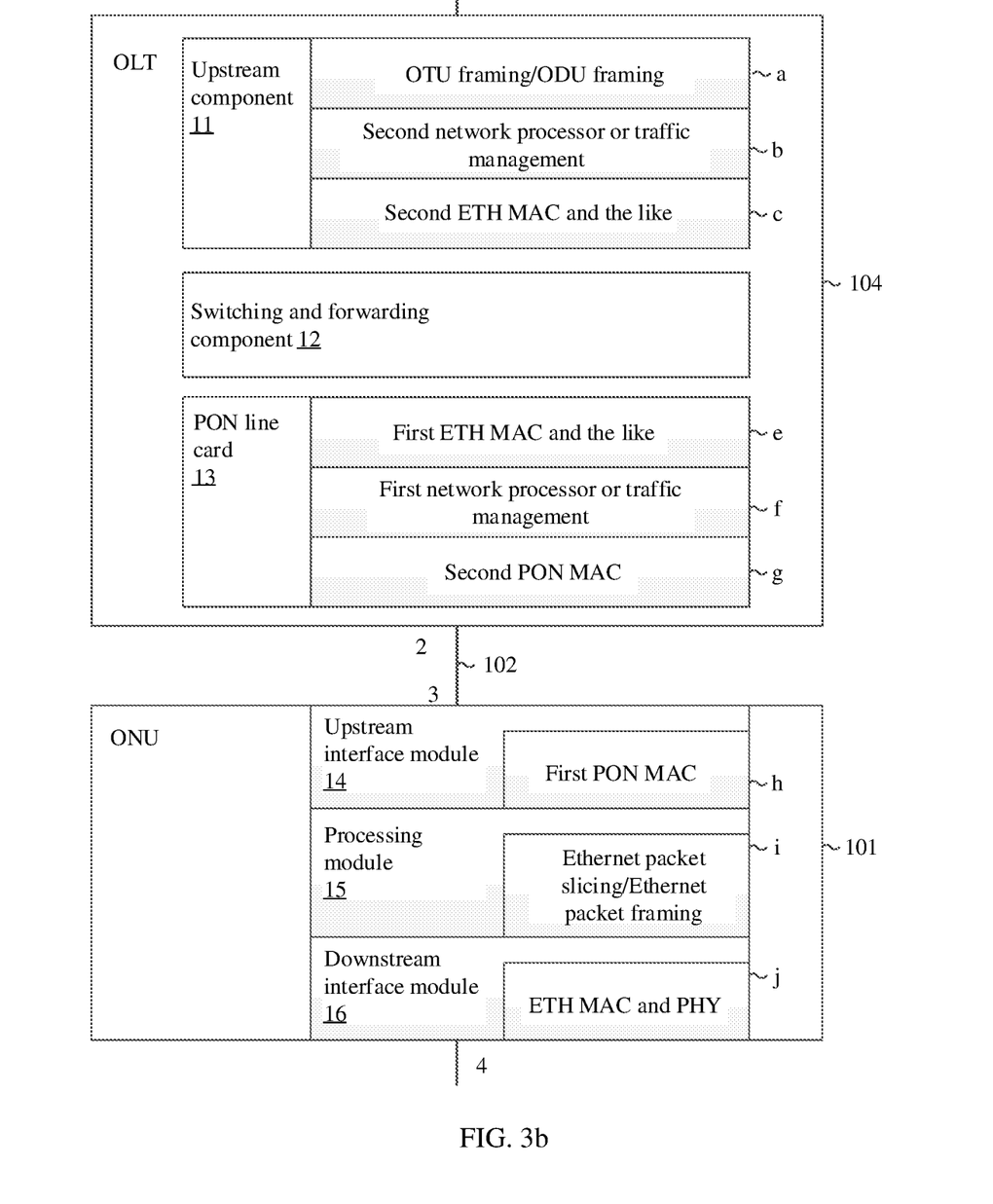
FIG. 3b is a schematic diagram depicting a structure of a PON system.

FIG. 3b is a schematic diagram depicting a structure of an embodiment of a PON system. As shown in FIG. 3b, the PON system includes an OLT 104, an ODN 102, and an ONU 101.

An upstream component 11 includes an OTU framing layer/optical channel data unit (ODU) framing layer a, a second network processor or traffic management layer b, and a second Ethernet (ETH) MAC and other module c. The PON line card 13 includes a first ETH MAC and other module e, a second network processor or traffic management layer f, and a second PON MAC layer g.

The ONU 101 includes an upstream interface module 14, a processing module 15, and a downstream interface module 16. The upstream interface module 14 includes an upstream interface 3 and a first PON MAC layer h. The processing module 15 includes an Ethernet packet slice/an Ethernet packet framing layer i. The downstream interface module 16 includes an ETH MAC and PHY layer j, and a downstream interface 4. The upstream interface module 14 is configured to: interact with the OLT 104 through the upstream interface 3 and send a first GEM frame generated by the first PON MAC layer h to the OLT 104, where the first GEM frame carries a first Ethernet packet slice and a first slice identifier. The first slice identifier indicates that a length of a minimum transmission unit of an OTN is an integer multiple of a length of the first Ethernet packet slice. The upstream interface module 14 is further configured to receive a second GEM frame sent by the OLT 104 through the upstream interface 3. The first PON MAC layer h parses the received second GEM frame to obtain a second Ethernet packet slice and a second slice identifier carried in the second GEM frame. The second slice identifier indicates that the length of the minimum transmission unit of the OTN is an integer multiple of a length of the second Ethernet packet slice.

It should be noted that both the foregoing embodiments and the following embodiments are described by using a gigabit-capable passive optical network (GPON) as an example. A GEM frame is transmitted between the OLT and the ONU in the GPON network. However, this manner may alternatively be applied to another PON network, such as a 10 GPON network, a 40 GPON network, or a 100 GPON network, provided that the GEM frame described above is replaced with a corresponding frame.

The downstream interface module 16 is configured to interact with user device (not shown in the figure) through the downstream interface 4 and receive a first Ethernet packet frame sent by the user device. The ETH MAC and PHY layer j processes the received first Ethernet packet frame. The downstream interface module 16 is further configured to send the second Ethernet packet frame restored by the Ethernet packet framing layer i to the user device through the downstream interface 4. It should be noted that the layer mentioned in this embodiment is a function layer corresponding to an internal processing procedure.

The Ethernet packet slicing layer i included in the processing module 15 is configured to slice the first Ethernet packet frame based on information about the minimum transmission unit of the optical transport network OTN, to generate a first Ethernet packet slice, where a length of the minimum transmission unit of the OTN is an integer multiple of a length of the first Ethernet packet slice. The Ethernet packet framing layer i included in the processing module is configured to restore the second Ethernet packet slice to a second Ethernet packet frame.

In this embodiment of the present disclosure, "I" is used to distinguish between upstream and downstream, for example, OTU framing/ODU framing. The OTU framing is used to perform OTU framing on an upstream Ethernet packet slice to generate an OTU frame. The ODU framing is used to perform ODU framing on a downstream Ethernet packet slice to generate an ODU frame. The Ethernet packet slicing/Ethernet packet framing layer i slices an Ethernet packet to generate an Ethernet packet slice when the Ethernet packet slicing is used for upstream and restores the received Ethernet packet slice to an Ethernet packet frame when the Ethernet packet framing is used for downstream.

Figure 4A:
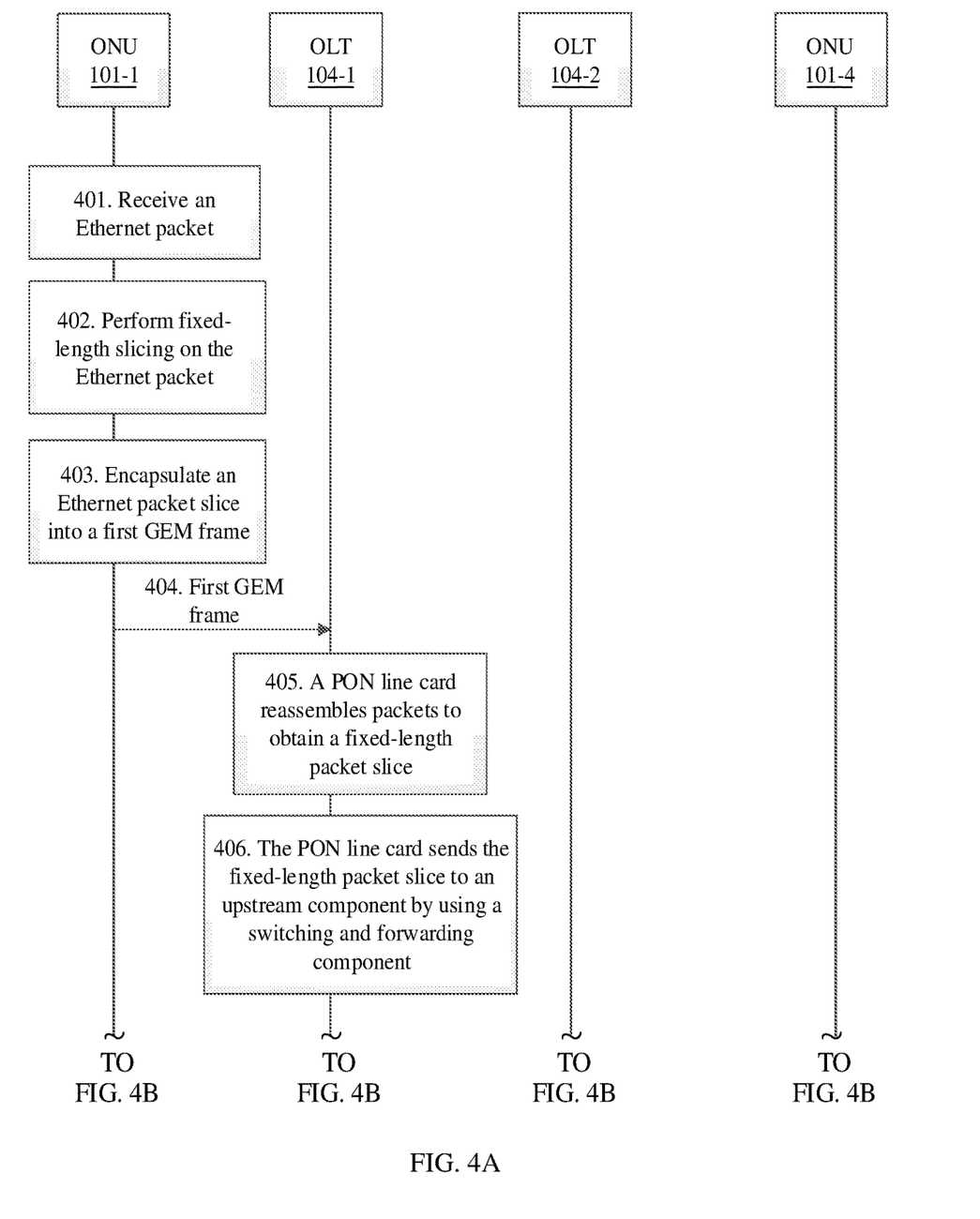
FIG. 4A and FIG. 4B are flowcharts of an embodiment of a packet processing method.
Figure 4B:
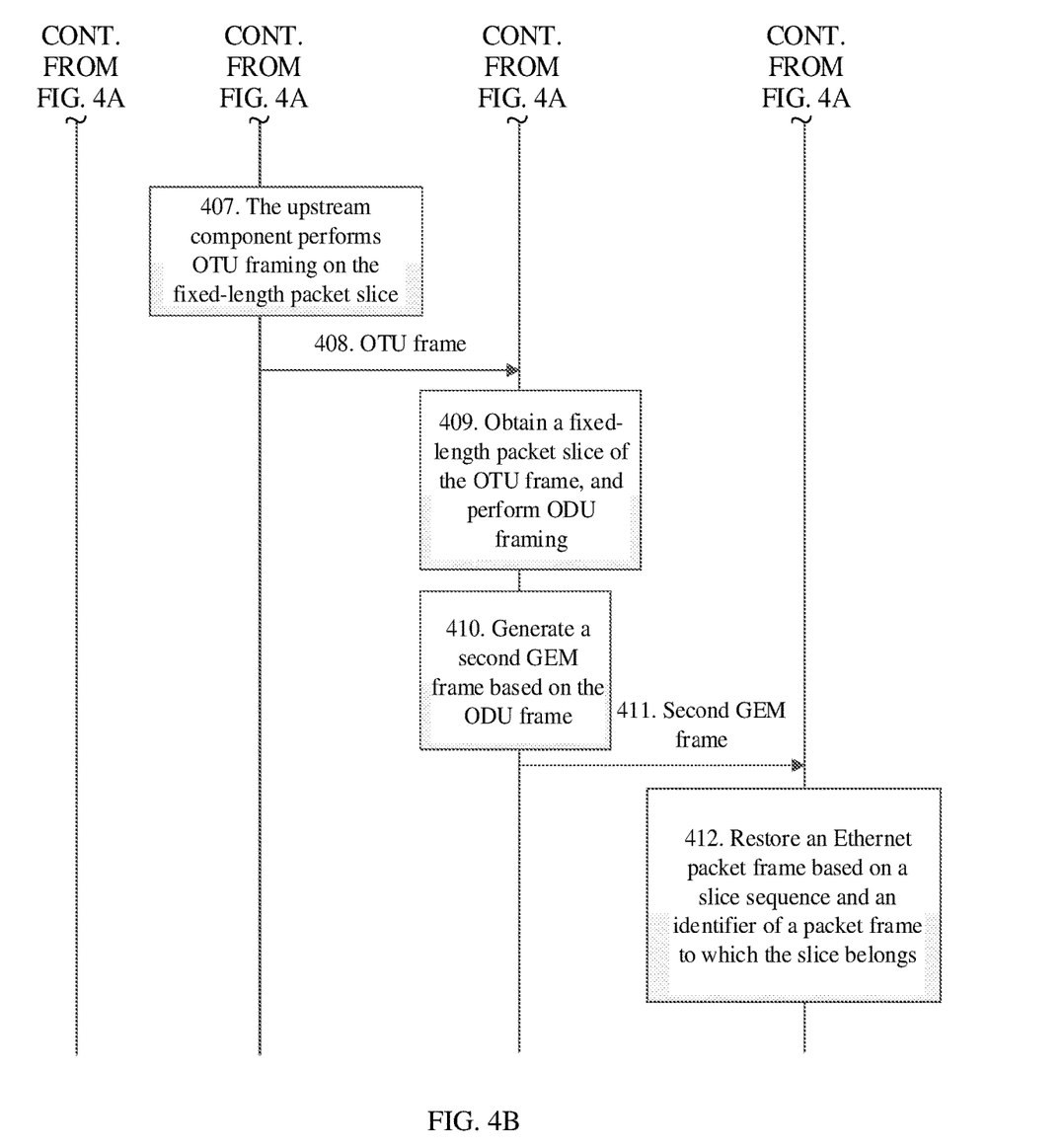

FIG. 4A and FIG. 4B are flowcharts of an embodiment of a packet processing method. With reference to FIG. 3a or FIG. 3b, this embodiment is described by using an example in which the ONU 101-1 slices an Ethernet packet frame to generate an Ethernet packet slice, and the peer ONU 101-4 restores the Ethernet packet slice to an Ethernet packet frame. An Ethernet packet slicing/Ethernet packet framing layer i is disposed in the ONU 101-1. The Ethernet packet slice is transmitted in an upstream direction from the ONU 101-1 to the OLT 104-1 and is transmitted to the peer ONU 101-4 by using the OTN. An Ethernet packet framing layer i of the peer ONU 101-4 restores the Ethernet packet slice to the Ethernet packet frame. As shown in FIG. 4A and FIG. 4B, the method in this embodiment may include the following steps.

S401. The ONU 101-1 receives an Ethernet packet frame sent by user device (not shown in the figure).

Refer to FIG. 3a or FIG. 3b. The ONU 101-1 receives the Ethernet packet frame sent by the user device through the interface 4 of the downstream interface module 16. The downstream interface module 16 or an ETH MAC and PHY layer j of the downstream interface module 16 processes the received Ethernet packet frame.

S402. The ONU 101-1 slices the Ethernet packet frame to generate an Ethernet packet slice.

The processing module 15 or the Ethernet packet slicing layer i in the processing module slices the processed Ethernet packet frame based on the information about the minimum transmission unit of the optical transport network OTN, to generate a fixed-length Ethernet packet slice. A length of the minimum transmission unit of the OTN is an integer multiple of a length of the Ethernet packet slice.

S403. The ONU 101-1 encapsulates the Ethernet packet slice into a first GEM frame.

After the Ethernet packet slicing layer i slices the Ethernet packet, the upstream interface module 14 or the first PON MAC layer of the upstream interface module 14 encapsulates the Ethernet packet slice into the first GEM frame. The first GEM frame further includes a slice identifier, and the slice identifier indicates that the length of the minimum transmission unit of the OTN is an integer multiple of the length of the Ethernet packet slice.

The first GEM frame may further include a total quantity of slices of the Ethernet packet. The slice identifier and the total quantity of the slices of the Ethernet packet are carried in a message header in the first GEM frame.

The first GEM frame may include all Ethernet packet slices of the Ethernet packet frame or may include some Ethernet packet slices of the Ethernet packet frame. This is not limited in this embodiment of the present disclosure.

S404. The ONU 101-1 sends the first GEM frame to the OLT 104-1.

The upstream interface module 14 or the upstream interface 3 of the upstream interface module 14 sends the first GEM frame to the OLT 104. For example, the first GEM frame is sent from the upstream interface 3 of the ONU 101-1 to the downstream interface 2 of the OLT 104-1.

S405. The PON line card 13 of the OLT 104-1 obtains a fixed-length packet slice of the first GEM frame.

The second PON MAC layer g of the PON line card 13 of the OLT 104-1 obtains, through conversion, the Ethernet packet slice based on the first GEM frame. For example, the second PON MAC layer g may obtain the Ethernet packet slice by reassembling a GEM port identifier and a PTY identifier that are of the first GEM frame.

S406. The PON line card 13 of the OLT 104-1 sends the obtained fixed-length packet slice to the OTU/ODU framing layer of the upstream component by using a switching and forwarding component 12.

The second PON MAC layer g of the PON line card 13 determines, based on the slice identifier in the first GEM frame, that the Ethernet packet slice does not enter a first network processor or traffic management layer f for processing. The first ETH MAC and other module e performs timeslot mapping on the Ethernet packet slice and then sends the Ethernet packet slice to the switching and forwarding component 12. The first ETH MAC and other module e may be an ETH MAC and a next generation switch fabric (NGSF) layer e.

The first ETH MAC and other module e switches the fixed-length packet slice to a second ETH MAC and other module c of the upstream component 11 by using the switching and forwarding component 12. The second ETH MAC and other module c of the upstream component 11 determines, based on the slice identifier, that the Ethernet packet slice does not enter the second network processor or traffic management layer b of the upstream component 11 for processing and that the fixed-length packet slice is sent to the OTU/ODU framing layer a. The second ETH MAC and other module c may be an ETH MAC and a next generation switch fabric (NGSF) layer c.

S407. The OTU/ODU framing layer a of the upstream component 11 of the OLT 104-1 performs OTU framing on the Ethernet packet slice.

In the upstream component 11, the second ETH MAC and other module c determines, based on the slice identifier, that the fixed-length packet slice does not enter the second network processor or traffic management layer b for processing but directly enters the OTU/ODU framing layer a and an OTU framing of the OTU/ODU framing layer a performs the OTU framing on the Ethernet packet slice to generate an OTU frame.

The OTU frame may include one or more Ethernet packet slices and the slice identifiers that are carried in the first GEM frame. The OTU frame may further include a total quantity of slices of the Ethernet packet. The slice identifier and the total quantity of the slices of the Ethernet packet are carried in a message header in the OTU frame. The OTU frame may include all Ethernet packet slices obtained from the first GEM frame or may include some Ethernet packet slices obtained from the first GEM frame.

S408. The OLT 104-1 sends the OTU frame to the OLT 104-2 by using the OTN.

S409. The OLT 104-2 receives the OTU frame and generates a second GEM frame based on the OTU frame.

The upstream component 11 of the OLT 104-2 receives the OTU frame through the upstream interface 1, and the upstream component 11 or the ODU framing layer a of the upstream component 11 converts the received OTU frame into an ODU frame. The ODU frame includes the Ethernet packet slice and the slice identifier. The ODU frame may further include a total quantity of slices of the Ethernet packet. The ODU framing layer of the OTU/ODU framing layer a determines, based on the slice identifier, that the Ethernet packet slice does not enter the NP or TM layer b, and directly passes through the second ETH MAC and other module c to the switching and forwarding component 12. The switching and forwarding component 12 switches the received fixed-length packet slice to the first ETH MAC and other module e of the PON line card 13. The first ETH MAC and other module e of the PON line card 13 further sends the received fixed-length packet slice to the second PON MAC layer g.

The second PON MAC layer g of the PON line card 13 obtains the Ethernet packet slice and the slice identifier. The second PON MAC layer g of the PON line card 13 encapsulates the Ethernet packet slice into the second GEM frame. The second GEM frame includes the Ethernet packet slice and the slice identifier. The second GEM frame may further include a total quantity of slices of the Ethernet packet. The slice identifier and the total quantity of the slices of the Ethernet packet are carried in a message header in the second GEM frame.

S410. The OLT 104-2 sends the second GEM frame to the ONU 101-4.

The second PON MAC layer g of the PON line card 13 of the OLT 104-2 allocates a target PON channel based on bandwidth required by the Ethernet packet slice, and deletes bandwidth occupied by the target PON channel from downstream DBA scheduling of the PON. The second PON MAC layer g of the PON line card 13 sends the second GEM frame from the downstream interface 2 of the PON line card through the target PON channel to the ONU 101-4 by using the ODN 102 from the upstream interface 3 of the ONU.

S411. The ONU 101-4 restores the Ethernet slice packet to an Ethernet packet frame based on the slice identifier and the Ethernet packet slice that are of the second GEM frame.

After the upstream interface module 14 of the ONU 101-4 receives the second GEM frame through the upstream interface 3, the first PON MAC layer of the upstream interface module 14 obtains, through conversion, the Ethernet packet slice based on the second GEM frame.

After the ONU 101-4 obtains the Ethernet packet slice, the Ethernet packet framing layer of the Ethernet packet slicing/Ethernet packet framing layer i determines, based on the total quantity of the slices of the Ethernet packet, that all fixed-length packet slices of the Ethernet packet are received. The Ethernet packet slicing/Ethernet packet framing layer i of the ONU 101-4 restores the Ethernet packet frame by using the Ethernet packet slice based on the slice identifier. The ONU 101-4 sends the Ethernet packet frame to the user device through the downstream interface 4 of the downstream interface module 16.

It should be noted that, to show the embodiments in a simple description, slicing is mainly performed on Ethernet data, and the Ethernet data is then encapsulated into a GEM frame. In a decapsulation and encapsulation process of a processing process, some overhead bytes such as a frame header and a parity bit may be deleted or added. These overhead bytes should also be considered in the slice length. For example, a data slice length is a length reserved in advance corresponding to an overhead byte that needs to be added when encapsulation is performed during subsequent processing.

In the packet processing method provided in this embodiment, the ONU 101-1 slices the received Ethernet packet, and encapsulates the Ethernet packet slice and the slice identifier into a first GEM frame and sends the first GEM frame to the OLT 104-1. The slice identifier indicates that the length of the minimum transmission unit of the OTN is an integer multiple of the length of the Ethernet packet slice. After receiving the first GEM frame, the OLT 104-1 obtains the Ethernet packet slice based on the slice indication and performs OTU framing. For the Ethernet packet slice, the PON line card 13 of the OLT 104-1 and the NP or TM layers f and b of the upstream component 11 do not need to perform packet forwarding processing and quality of service control, so that a delay caused by the packet forwarding processing and quality of service control by the NP or TM module may be reduced on a packet transmission path, thereby implementing low-delay transmission.

In an optional solution, the Ethernet packet slicing/Ethernet packet framing layer i of the ONU in FIG. 3a or FIG. 3b may alternatively be disposed in the PON line card 13 of the OLT 104. For example, the Ethernet packet slicing/Ethernet packet framing layer i of the ONU may be disposed between the second PON MAC layer g and the first network processor or traffic management layer f. After the PON line card 13 receives the first GEM frame sent by the ONU 101 through the downstream interface 2, the second PON MAC layer of the PON line card 13 processes the first GEM frame to obtain the Ethernet packet frame. The Ethernet packet slicing layer of the PON line card slices, based on the information about the minimum transmission unit of the OTN, the Ethernet packet frame that is processed by the second PON MAC layer, to generate the Ethernet packet slice. The length of the minimum transmission unit of the OTN is an integer multiple of the length of the Ethernet packet slice. After slicing the Ethernet packet to generate an Ethernet packet slice, the Ethernet packet slicing layer determines that the Ethernet packet slice does not need to be processed by the first network processor or traffic management layer f and sends the Ethernet packet slice and the slice identifier to the first ETH MAC and other module d of the PON line card 13. After being processed by the first ETH MAC and other module d, the Ethernet packet slice and the slice identifier are routed by the switching and forwarding component 12 to the second ETH MAC and other module c of the upstream component 11. The second ETH MAC and other module c of the upstream component 11 determines, based on the slice identifier, that the Ethernet packet slice is not processed by the second network processor or traffic management layer b of the upstream component 11, and the OTU framing layer a of the upstream component 11 performs the OTU framing on the Ethernet packet slice. In addition, the OLT 104 may be further configured to receive a second OTN frame sent by an OTN device, where the second OTN frame includes a second Ethernet network slice. The Ethernet packet framing layer of the PON line card 13 of the OLT 104 restores the second Ethernet packet slice to an Ethernet packet frame based on the second slice identifier. In other words, the Ethernet packet slicing/Ethernet packet framing layer of the PON line card 13 may perform a function performed by the Ethernet packet slicing/Ethernet packet framing layer i of the ONU. Details are not described herein in this embodiment of the present disclosure.

For an operation of implementing each module of the ONU in this embodiment, further refer to related descriptions in the method embodiment. An implementation principle of each module of the ONU in this embodiment are similar to those of the method embodiment, and details are not described herein again. The module herein may alternatively be replaced with a component or a circuit.

Figure 5:
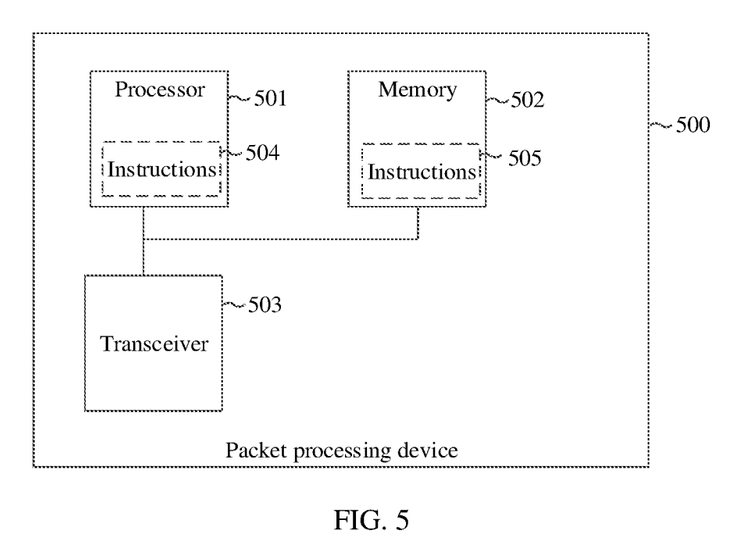
FIG. 5 is a schematic diagram depicting a structure of an embodiment of a packet processing device.

FIG. 5 is a schematic diagram depicting a structure of a packet processing device. The packet processing device may be an OLT or an ONT. The packet processing device may be configured to implement a method in a corresponding part described in the foregoing method embodiments. For details, refer to the description in the foregoing method embodiments.

The packet processing device may include one or more processors 501. The processor 501 may also be referred to as a processing unit and may implement a specific control function. The processor 501 may be a general-purpose processor, a dedicated processor, or the like. For example, the processor 501 may be a baseband processor or a central processing unit. The baseband processor may be configured to process a communications protocol and communications data. The central processing unit may be configured to control a communications apparatus (for example, a base station, a baseband chip, a DU, or a CU), execute a software program, and process data in the software program.

In a possible embodiment, the processor 501 may further store instructions 504. The instructions 504 may be run by the processor 501, so that the packet processing device performs the method that corresponds to the optical network unit ONU or the optical line terminal OLT described in the foregoing method embodiments.

In another possible embodiment, the packet processing device may include a circuit. The circuit may implement the sending, receiving, or communication function in the foregoing method embodiments.

Optionally, the packet processing device may include one or more memories 502. The memory 502 stores instructions 505 or intermediate data. The instructions 505 may be run by the processor 501, so that the packet processing device performs the method described in the foregoing method embodiments. Optionally, the memory 502 may further store other related data. Optionally, the processor 501 may also store instructions and/or data. The processor 501 and the memory 502 may be separately disposed or may be integrated together.

Optionally, the packet processing device may further include a transceiver 503. The transceiver 503 may be referred to as a transceiver unit, a transceiver, a transceiver circuit, a transceiver, or the like, and is configured to implement a transceiver function of the communications apparatus.

A readable storage medium stores executable instructions. When at least one processor of the packet processing device executes the executable instructions, the packet processing device performs the packet processing method in the foregoing method embodiments.

A non-transitory machine-readable storage medium stores executable instructions. At least one processor of a packet processing device may read the executable instructions from the non-transitory machine-readable storage medium. The at least one processor executes the executable instructions, so that the packet processing device implements the packet processing method in the foregoing method embodiments.

Figure 6:
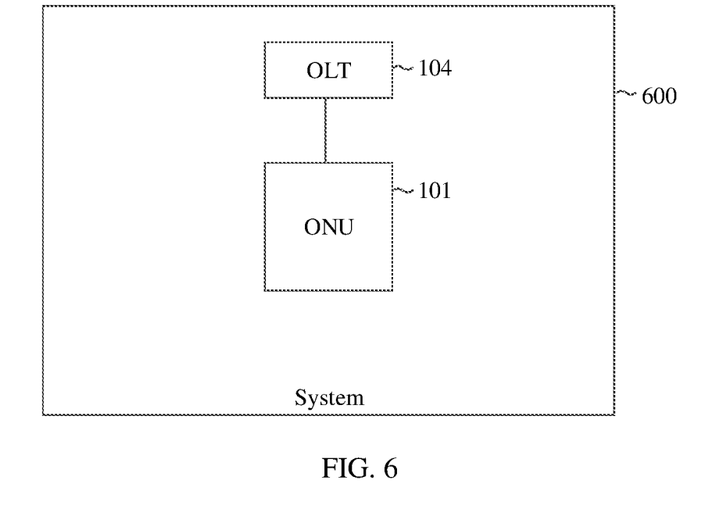
FIG. 6 is a schematic diagram depicting a structure of a PON system.

FIG. 6 is a schematic diagram depicting a structure of a PON system 600. The PON system includes the OLT 104 and the ONU 101 in the foregoing embodiments.

The OLT 104 may perform the foregoing embodiments and any step performed by the OLT 104 in FIG. 3 or FIG. 5. The ONU 101 may perform the foregoing embodiments and any step performed by the ONU 101 in FIG. 3 or FIG. 5. In this embodiment of the present disclosure, details are not described herein again.

The embodiments are all described in a progressive manner, for same or similar parts in the embodiments, refer to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are completely or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

What is claimed is:

1. A packet processing method, comprising:
   receiving, by an optical network unit (ONU), an Ethernet packet frame sent by a user device;
   slicing, by the ONU, the Ethernet packet frame based on information about a minimum transmission unit of an optical transport network (OTN) to generate a first Ethernet packet slice, wherein a length of the minimum transmission unit of the OTN is an integer multiple of a length of the first Ethernet packet slice; and
   sending, by the ONU, a GPON Encapsulation Mode (GEM) frame to an optical line terminal (OLT), wherein the Ethernet packet slice and a slice identifier are encapsulated into the GEM frame, and the slice identifier indicates that the length of the minimum transmission unit of the OTN is an integer multiple of the length of the Ethernet packet slice.

2. The method according to claim 1, wherein the method further comprises:
   obtaining, by the ONU, the information about the minimum transmission unit of the OTN; or
   configuring the information about the minimum transmission unit of the OTN in the ONU.

3. The packet processing method according to claim 1, wherein the method further comprises:
   caching, by the ONU, the Ethernet packet slice based on a cache threshold.

4. A packet processing method comprising:
   receiving, by an optical line terminal (OLT), a GPON Encapsulation Mode (GEM) frame sent by an optical network unit (ONU), wherein an Ethernet packet slice and a slice identifier are encapsulated into the GEM frame, and the slice identifier indicates that a length of a minimum transmission unit of an optical transport network (OTN) is an integer multiple of a length of the Ethernet packet slice; and
   sending, by the OLT, an optical transponder unit (OTU), frame to an OTN device, wherein the OTU frame carries the Ethernet packet slice and the slice identifier.

5. The packet processing method according to claim 4, wherein the method further comprises:
   determining, by the OLT based on the slice identifier, that network processing (NP) or traffic management (TM) processing is not performed on the Ethernet packet slice.

6. The packet processing method according to claim 5, wherein the method further comprises:
  performing, by the OLT, OTU framing on the Ethernet packet slice to generate the OTU frame, wherein the OTU frame carries the Ethernet packet slice and the slice identifier.

7. A packet processing device, comprising a memory and a processor, wherein the memory is configured to store program instructions and the processor is configured to invoke program instructions in the memory to perform:
  receiving an Ethernet packet frame sent by a user device;
  slicing the Ethernet packet frame based on information about a minimum transmission unit of an optical transport network (OTN) to generate a first Ethernet packet slice, wherein a length of the minimum transmission unit of the OTN is an integer multiple of a length of the first Ethernet packet slice; and
  sending a GPON Encapsulation Mode (GEM) frame to an optical line terminal (OLT), wherein the Ethernet packet slice and a slice identifier are encapsulated into the GEM frame, and the slice identifier indicates that the length of the minimum transmission unit of the OTN is an integer multiple of the length of the Ethernet packet slice.

8. The packet processing device according to claim 7, wherein the processor is further configured to invoke program instructions in the memory to perform:
  obtaining the information about the minimum transmission unit of the OTN; or
  configuring the information about the minimum transmission unit of the OTN in the ONU.

9. The packet processing device according to claim 7, wherein the processor is further configured to invoke program instructions in the memory to perform:
  caching the Ethernet packet slice based on a cache threshold.

* * * * *